(12) United States Patent  
Patwardhan et al.

(10) Patent No.: US 10,044,591 B2
(45) Date of Patent: Aug. 7, 2018

(54) TWO-WAY REMOTE COMMUNICATION SYSTEM FOR TESTING A CLIENT DEVICE PROGRAM

(71) Applicant: Home Box Office, Inc., New York, NY (US)

(72) Inventors: Makarand V. Patwardhan, Redmond, WA (US); Tyler R. Furtwangler, Sammamish, WA (US); Brandon C. Furtwangler, Issaquah, WA (US); Jesse Corrington, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 194 days.

(21) Appl. No.: 14/843,893

(22) Filed: Sep. 2, 2015

(65) Prior Publication Data

US 2016/0072692 A1   Mar. 10, 2016

Related U.S. Application Data

(60) Provisional application No. 62/046,119, filed on Sep. 4, 2014, provisional application No. 62/046,122, filed on Sep. 4, 2014.

(51) Int. Cl.
*G06F 11/36* (2006.01)
*H04L 12/26* (2006.01)
(Continued)

(52) U.S. Cl.
CPC .............. *H04L 43/14* (2013.01); *G06F 11/30* (2013.01); *G06F 11/3644* (2013.01);
(Continued)

(58) Field of Classification Search
CPC ............. G06F 11/3438; G06F 11/3688; G06F 21/552; G06F 9/486; G06F 9/505;
(Continued)

(56) References Cited

U.S. PATENT DOCUMENTS 5,157,384 A   10/1992   Greanias et al.
5,801,696 A   9/1998   Roberts
(Continued)

OTHER PUBLICATIONS

International Search Report and Written opinion from International Patent Application Serial No. PCT/US15/48397, dated Nov. 20, 2015, 12 pages.
(Continued)

*Primary Examiner* — Le H Luu
(74) *Attorney, Agent, or Firm* — Amin, Turocy & Watson, LLP

(57) ABSTRACT

The described technology is directed towards server-controlled testing and/or monitoring of a client device application program. The server loads plug-in components directed towards the testing and/or monitoring operations, and instructs the client device to couple counterpart plug-in components to the client device application program. The server's plug-in components communicate with the application program's plug-in components to run the testing and/or monitoring operations, which may be automated, send queries to the client to receive responses, and send commands to the client to take actions. The server includes dashboards for interacting with the client device. The client device includes virtual input devices that allow the server to inject input into the client application program.

20 Claims, 11 Drawing Sheets

(51) Int. Cl.
  *H04L 29/06* (2006.01)
  *G06F 11/30* (2006.01)

(52) U.S. Cl.
  CPC ...... *G06F 11/3664* (2013.01); *G06F 11/3668* (2013.01); *G06F 11/3672* (2013.01); *G06F 11/3696* (2013.01); *H04L 43/50* (2013.01); *H04L 67/40* (2013.01); *H04L 67/42* (2013.01)

(58) Field of Classification Search
  CPC ............. G06F 11/3664; G06F 11/3668; G06F 11/3672; G06F 11/3696; G06F 11/3644; G06F 11/30; H04L 63/00; H04L 63/166; H04L 43/14; H04L 43/50; H04L 67/40; H04L 67/42; H04W 4/001
  See application file for complete search history.

(56) References Cited

U.S. PATENT DOCUMENTS

| | | | |
|---|---|---|---|
| 5,878,113 A | | 3/1999 | Bhusri |
| 6,463,581 B1 | | 10/2002 | Bacon et al. |
| 7,451,455 B1 | | 11/2008 | El-Haj |
| 8,185,838 B2 | | 5/2012 | Bomers |
| 2004/0111673 A1 | | 6/2004 | Bowman et al. |
| 2004/0243349 A1* | 12/2004 | Greifeneder | ........ H04L 63/0428 702/183 |
| 2006/0149550 A1 | | 7/2006 | Salminen |
| 2006/0209016 A1 | | 9/2006 | Fox et al. |
| 2007/0130535 A1 | | 6/2007 | DeMaio et al. |
| 2007/0239859 A1* | 10/2007 | Wilkinson | ............... G06F 9/505 709/220 |
| 2007/0288937 A1 | | 12/2007 | Durojaiye et al. |
| 2008/0082991 A1 | | 9/2008 | Fairs et al. |
| 2008/0313607 A1 | | 12/2008 | Yutaka et al. |
| 2009/0254351 A1 | | 10/2009 | Shin et al. |
| 2009/0271514 A1* | 10/2009 | Thomas | ............... G06F 11/3438 709/224 |
| 2010/0162212 A1 | | 6/2010 | Stall et al. |
| 2011/0302653 A1* | 12/2011 | Frantz | ................... G06F 21/552 726/22 |
| 2012/0096365 A1* | 4/2012 | Wilkinson | ............... G06F 9/468 715/740 |
| 2012/0255022 A1* | 10/2012 | Ocepek | ................ G06F 21/552 726/25 |
| 2012/0265516 A1 | | 10/2012 | Ark et al. |
| 2013/0067298 A1* | 3/2013 | Li | ....................... G06F 11/3688 714/799 |
| 2013/0268357 A1* | 10/2013 | Heath | .................... H04L 63/00 705/14.53 |
| 2013/0332524 A1* | 12/2013 | Fiala | .................... H04W 4/001 709/204 |
| 2014/0075458 A1 | | 3/2014 | Wright et al. |
| 2015/0039285 A1 | | 2/2015 | Qian |

OTHER PUBLICATIONS

James Mickens, "Rivet: Browser-agnostic Remote Debugging for Web Applications," Apr. 11, 2013, 14 pages.
International Search Report and Written Opinion from International Patent Application Serial No. PCT/US2015/048402, dated Nov. 30, 2015, 13 pages.
Office Action for U.S. Appl. No. 14/843,877 dated Aug. 8, 2017, 28 pages.
Ostrand, et al., "A Visual Test Development Environment for GUI Systems," Software Engineering Notes, Mar. 1, 1998 ACM, New York, NY, US—ISSN 0163-5948, XP000740949, vol. 23, No. 2, pp. 82-92.
International Search Report and Written Opinion from International Patent Application Serial No. PCT/US2015/048398, dated Nov. 27, 2015, 10 pages.
Office Action for U.S. Appl. No. 14/843,882 dated Dec. 16, 2016, 22 pages.
Office Action for U.S. Appl. No. 14/843,882 dated May 4, 2017, 37 pages.
International Search Report and Written Opinion from International Patent Application Serial No. PCT/US2015/048397, dated Nov. 20, 2015, 9 pages.
Andrej Vckovski, Netcetera AG Nuetcetera, "wshdbg—A Debugger for CGI Applications," Sep. 11, 1998, 10 pages.
Mickens, "Rivet: Browser-agnostic Remote Debugging for Web Applications," Apr. 11, 2013, 14 pages.
Office Action for U.S. Appl. No. 14/843,893 dated Aug. 29, 2017, 14 pages.
Notice of Allowance for U.S. Appl. No. 14/843,882 dated Aug. 16, 2017, 37 pages.
International Preliminary Report on Patentability from International Patent Application Serial No. PCT/US2015/48398, dated Mar. 16, 2017, 8 pages.
International Preliminary Report on Patentability from International Patent Application Serial No. PCT/US2015/48397, dated Mar. 7, 2017, 7 pages.
International Preliminary Report on Patentability from International Patent Application Serial No. PCT/US2015/048402, dated Mar. 16, 2017, 9 Pages.
Office Action for U.S. Appl. No. 14/843,877 dated Feb. 7, 2018, 31 pages.
Office Action for U.S. Appl. No. 15/844,781 dated Jan. 24, 2018, 42 pages.
Notice of Allowance for U.S. Appl. No. 14/843,877 dated May 17, 2018, 36 pages.

* cited by examiner

TWO-WAY REMOTE COMMUNICATION SYSTEM FOR TESTING A CLIENT DEVICE PROGRAM

CROSS-REFERENCE TO RELATED APPLICATION

The present application claims priority to U.S. provisional patent application Ser. Nos. 62/046,119 and 62/046,122, filed Sep. 4, 2014, the entireties of each are incorporated herein by reference.

BACKGROUND

A typical contemporary computer program needs to undergo testing, monitoring, debugging and/or troubleshooting, including when the program is operating remotely. In order to do this successfully, a significant amount of information often needs to be exchanged with a server doing the testing, for example, and the testing server and device being tested need to participate in an organized way.

For example, consider a test that is run on on a server that needs to simulate input to a program via certain input devices. Without well-ordered and controlled participation, testing and troubleshooting may be difficult given the various types of input devices, each of which may have its own nuances.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards coupling a server machine to a remote client device for testing and/or monitoring of a client device program. One or more server-side (e.g., "plug-in") components related to the testing and/or monitoring of the client device program are loaded, and used to have server-side specified testing and/or monitoring operations performed on the client device program. The server receives logging data corresponding to the set of testing operations performed on the client device program and/or receives monitoring data corresponding to the set of monitoring operations performed on the client device program.

Other advantages may become apparent from the following detailed description when taken in conjunction with the drawings.

BRIEF DESCRIPTION OF THE DRAWINGS

The present technology is illustrated by way of example and not limited in the accompanying figures in which like reference numerals indicate similar elements and in which.

DETAILED DESCRIPTION

Figure 1:
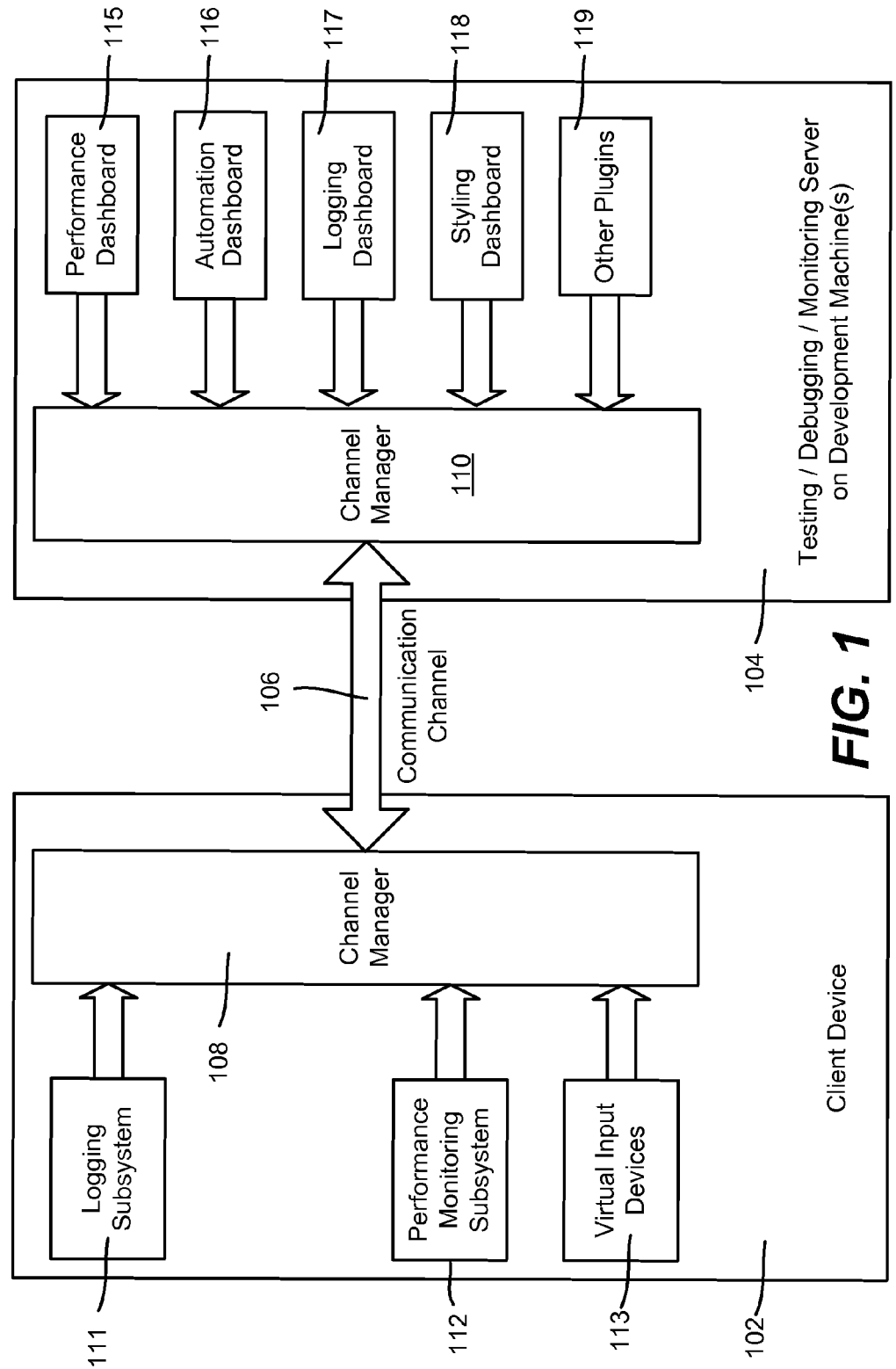
FIG. 1 is a block diagram showing example components for implementing a two-way communication system, according to one or more example implementations.

The technology described herein is directed towards an architecture, two-way communication channel and protocol between platform applications and a development-test environment. The architecture enables rich logging, monitoring, and automation support in order to enhance application development and/or improvement.

In one example implementation, a channel manager comprises a platform component that establishes a socket connection between a client-run application program (e.g., HBO® GO) and a server on a development computer. The channel manager provides a communication mechanism for platform components that are part of the application to communicate with the server. These platform components use this communication mechanism, referred to herein as the communication channel, to help debug and monitor the application. The communication channel along with the architecture and protocol also helps with testing and with automation of various development tasks. The communication channel thus facilitates performance monitoring, debugging, event logging, automation or any other system that needs to talk to a client.

By way of example with reference to a logging subsystem, various application components log events and states. These logs are sent over the communication channel to a logging dashboard of the development computer for further processing and analysis.

By way of example with reference to input devices, various virtual input devices are created in response to requests received over the communication channel from the automation dashboard. These devices then receive input events from the automation dashboard, which drive the application for testing and automation purposes as if they were actual physical input devices coupled to the client device.

By way of example with reference to performance monitoring, while the application is running, various performance-related information is captured and sent over the communication channel to the performance dashboard of the development computer for monitoring and debugging.

It should be understood that any of the examples herein are non-limiting. For one, the terms "test" or "monitor" as used herein along with related terms (e.g., "tested," "testing," "monitored," monitoring" and so forth) are intended to cover any remote operations/interactions directed towards a client device, including troubleshooting, debugging, assisting with configuration of the device/program and so on, along with any related communications received. Test and monitor are not mutually exclusive, e.g., a test may be run to inject some input into a device with the result of doing so monitored. For another, although an example of a client application program is used with a "remotely" connected server, it is understood that any computer program and device that can connect may benefit from the technology described herein, and that "remote" is not intended to convey any concept of distance; (e.g., a server remotely coupled to a device may be inches apart to many miles apart). Still further, while virtual (e.g., simulated) input is described, actual user input and virtual input from a tester/developer, whether local and/or remote, may be used in conjunction with testing and/or monitoring, such as for refining or extending an otherwise automated test, e.g., allowing a user to confidentially enter credentials that a test needs to have to operate, allowing a tester to dynamically vary current conditions, and so on. As such, the technology described herein is not limited to any particular embodiments, aspects, concepts, structures, functionalities or examples described herein. Rather, any of the embodiments, aspects, concepts, structures, functionalities or examples described herein are non-limiting, and the present technology may be used in various ways that provide benefits and advantages in computing technology in general.

FIG. 1 shows a client device 102 coupled to a testing/debugging/monitoring server 104 or the like running on a development computer via a communication channel 106, e.g., a socket connection. There is a client-side channel manager 108 and a server-side channel manager 110 that each help set up/deal with communications over the communication channel 106, that is, each channel manager comprises a component that establishes a socket connection between a client-run application program (e.g., HBO® GO) and a server on a development computer.

The client device 102 may include a logging subsystem 111, a performance monitoring subsystem 112 and/or various virtual input devices 113. One or more of these may be counterpart plug-ins (selectable executable components) or the like to similar plug-ins on the server. As can be readily appreciated, there may be additional plug-in components on the client device 102.

The server includes various plug-in type dashboards with which a developer/tester may interact, e.g., a performance dashboard 115, an automation dashboard 116, a logging dashboard 117, a styling dashboard 118, and other plug-in components 119. As can be readily appreciated, not all of the dashboards exemplified in FIG. 1 need be present in a given implementation, and one or more others may be present instead of or in addition to those exemplified.

Figure 2:
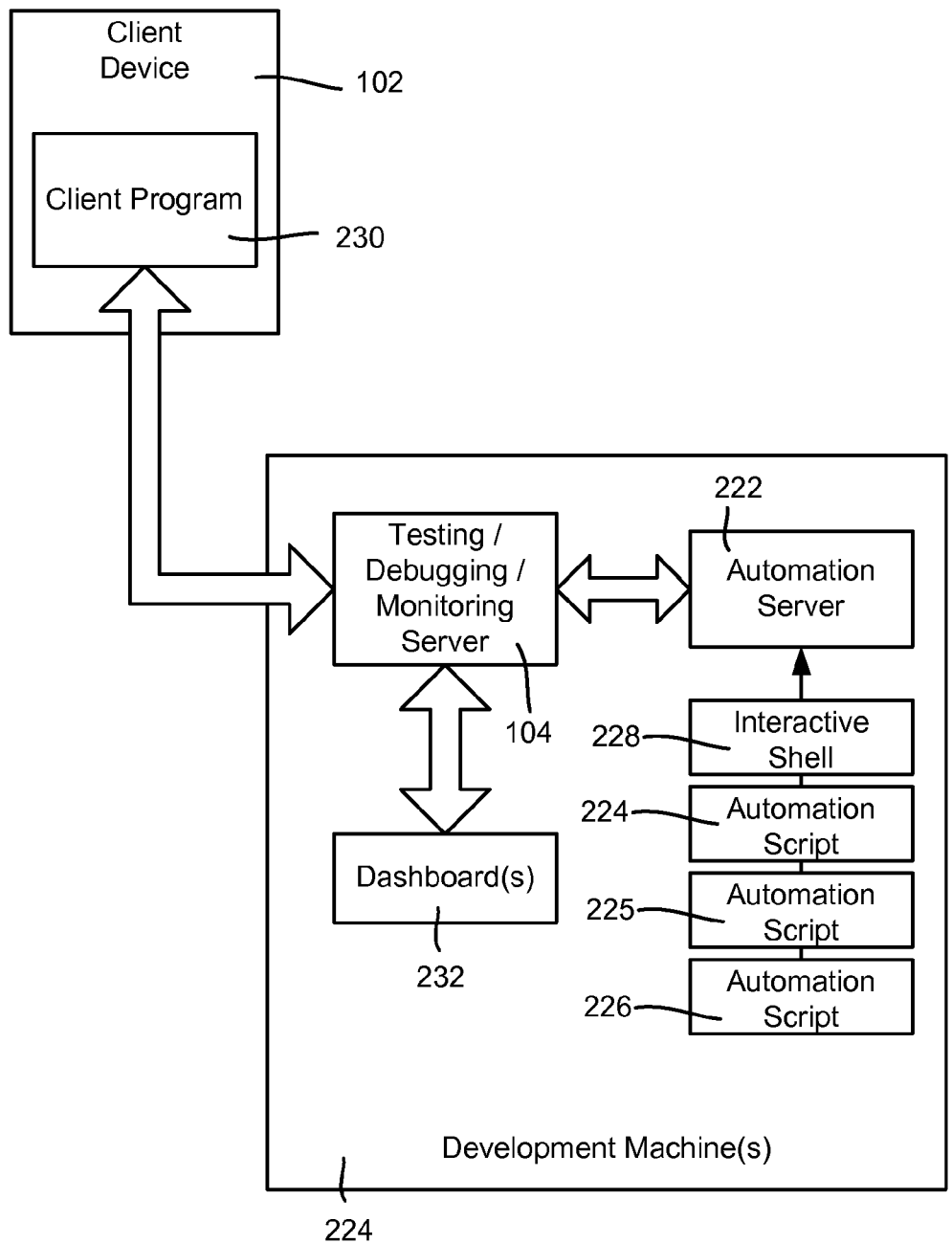
FIG. 2 is a block diagram showing example components that use the two-way communication system for client testing, debugging, monitoring and/or the like at a server, including via automation, according to one or more example implementations.

FIG. 2 shows the concept of automation, in which an automation server 222 is coupled to the testing/debugging/monitoring server 104 (running on the development machine or machines 224) and runs one or more scripts; (e.g., three scripts 224-226 are shown, but there may be any practical number available, and zero or more may be run for a given session). An interactive shell 228 allows a developer/tester to interact with the automation server 222. Also shown for completeness in FIG. 2 is the client program 230 on the client device and the dashboard(s) 232 coupled to the testing/debugging/monitoring server 104.

Figure 3:
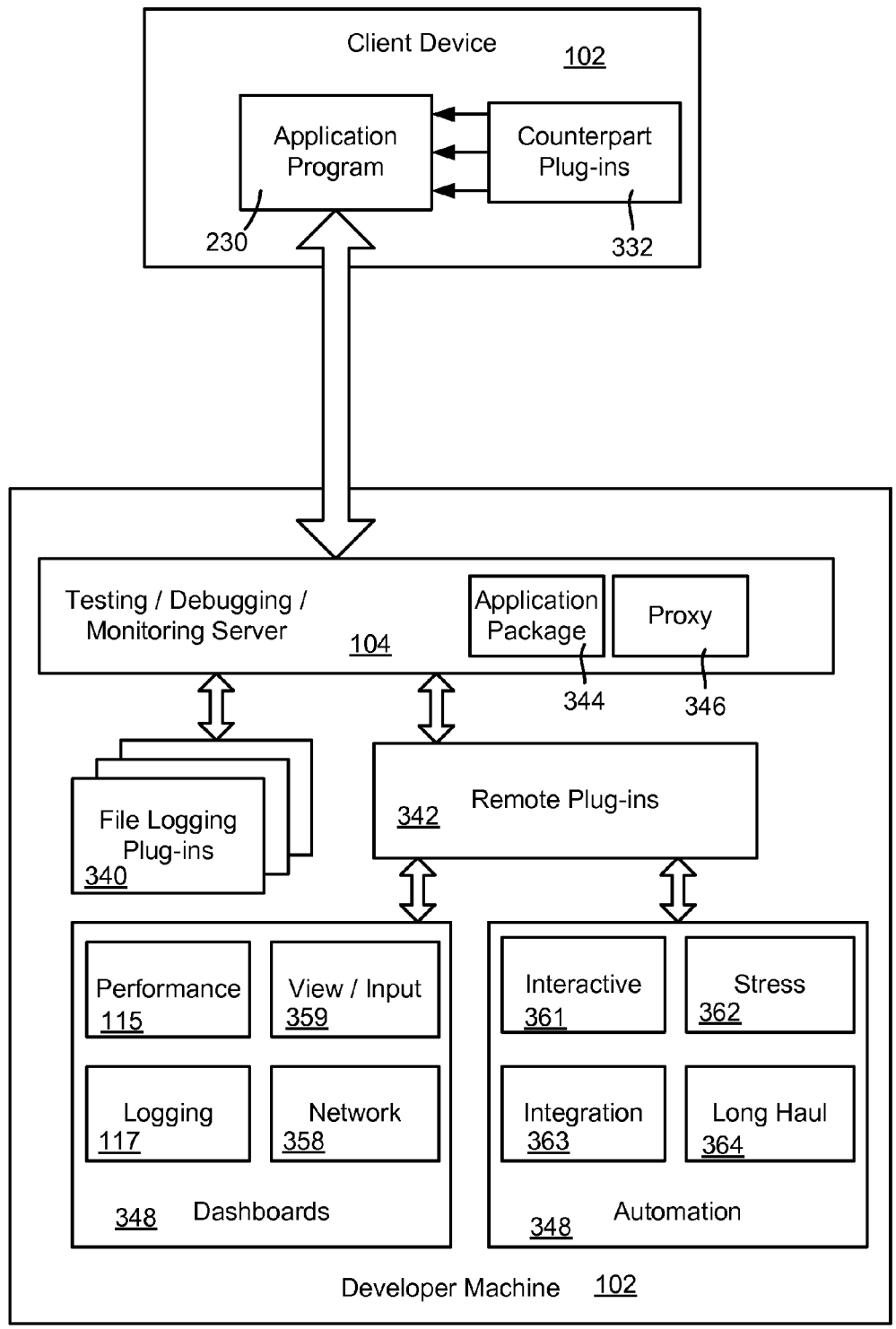
FIG. 3 is a block diagram showing example server-side components used for client testing, debugging, monitoring and/or the like at the server, including via automation, according to one or more example implementations.

FIG. 3 shows additional details of the developer machine components (plus the client device 102 with its program 230 and plug-ins 332 that are counterparts to the developer machine's plug-ins 340 and 342). The testing/debugging/monitoring server 104 may have different application packages for different programs and platforms, with one such application package 344 an associated proxy 346 loaded for operating with the client program 230/client device 104. The dashboards 346 represented in FIG. 3 include the performance dashboard 115 and the logging dashboard 117 of FIG. 1, along with a network dashboard 358, and a view/input dashboard 359. Automation 360 in FIG. 3 includes examples of some possible types of test scripts or the like, including an interactive test 361 (which may include some automated code and some interaction), an automated stress test 362, an automated integration test 363 and a long haul test 364. As can be readily appreciated, any automated test may be fully automated but may include some manual interaction, e.g., to change some settings during a stress test.

Figure 4:
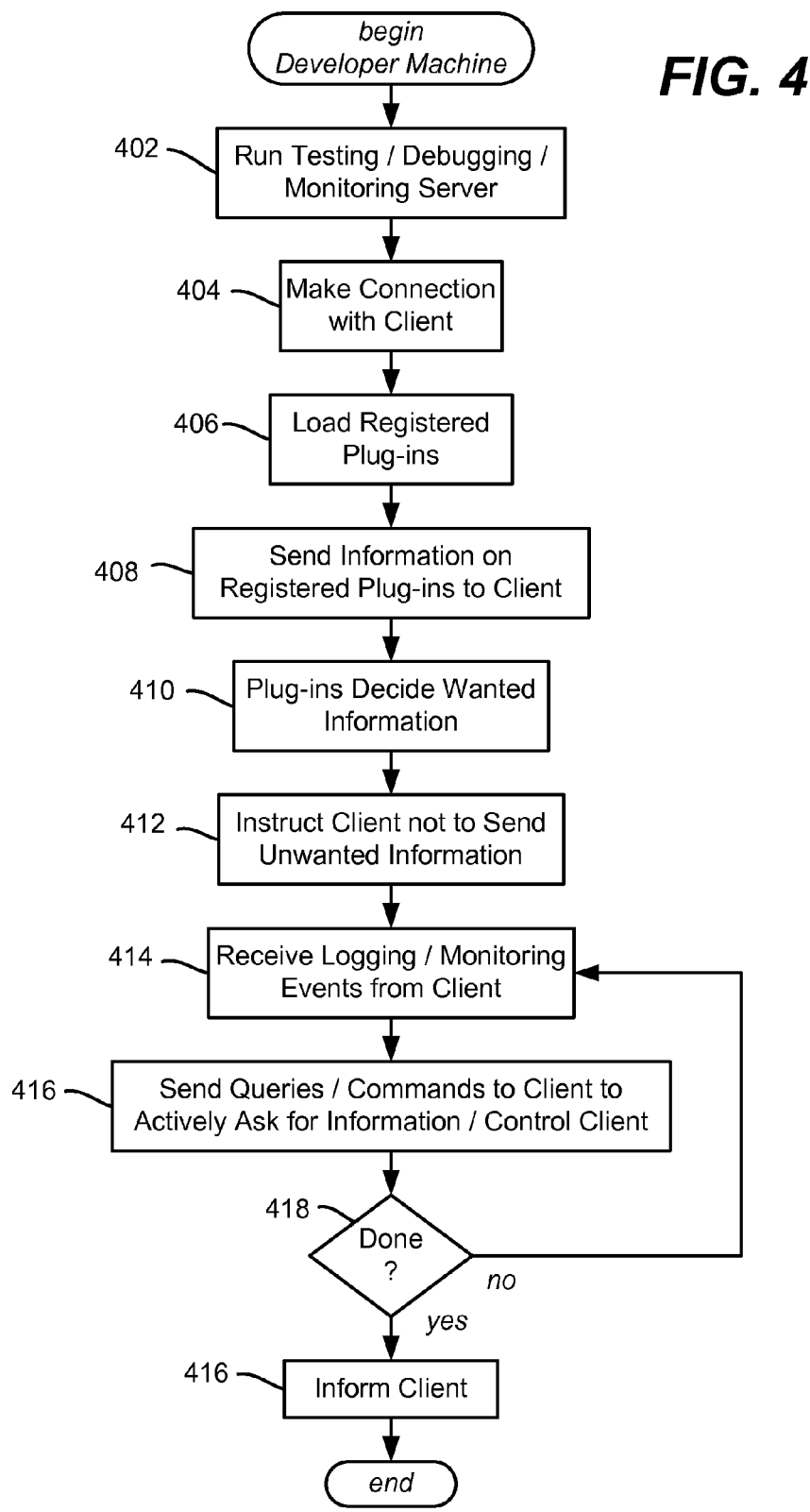
FIG. 4 is a flow diagram showing example steps that may be taken by a server to couple with a client and thereafter communicate with the client for testing, debugging, monitoring and/or the like at the server, according to one or more example implementations.
Figure 5:
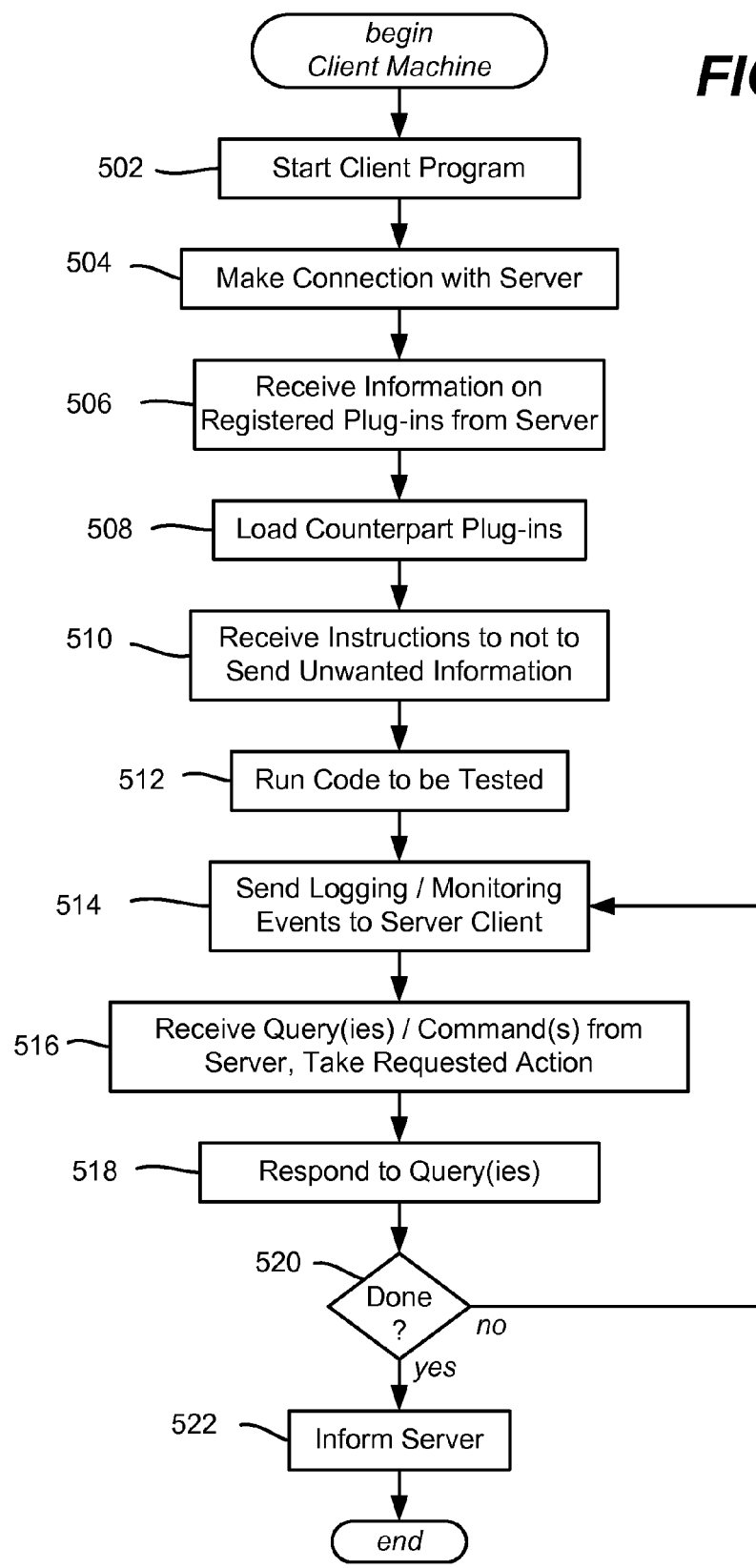
FIG. 5 is a flow diagram showing example steps that may be taken by a client to couple with a server and thereafter communicate with the server for testing, debugging, monitoring and/or the like, according to one or more example implementations.

FIG. 4 is a flow diagram showing some example steps that the server side components may take in working with a client device application program to perform testing, monitoring, debugging, troubleshooting operations and/or the like. FIG. 5 is a flow diagram showing some example corresponding steps that the client side components may take to work with the server.

Step 402 of FIG. 4 represents the server (the testing/debugging/monitoring server 104) starting to run on a developer machine. Step 502 of FIG. 5 starts the client application program, e.g., HBO® Go, (which may run on any of various platforms/devices including smartphones, gaming and entertainment consoles, browsers and so on. Via the channel managers, the server and client establish a communication channel as represented via step 404 of FIG. 4 and step 504 of FIG. 5.

The server loads one or more of its registered plug-ins at step 406, and communicates information regarding these plug-ins to the client (step 408). When received by the client, (step 506 of FIG. 5), the client loads its counterpart plug-in(s) at step 508. Each plug-in exposes an interface that lets that server plug-in and counterpart client plug-in communicate with each other.

Plug-ins registered with the automation server can decide which pieces of information they want from the automation server and/or the client. For example, if a piece of information (e.g., BitRates for animation) is not requested by any plug-in, the automation server, during its handshake with the client application, asks the client to not send that type of unwanted information, and thereby help limit the amount of information received from the client. This is represented on the server side via steps 410 and 412 of FIG. 4, and on the client side via step 510.

Once set up, the rest of the client program code (e.g., the code being tested, monitored, etc.) runs, as represented by step 512 of FIG. 5. During running, as represented by step 514 of FIG. 5, the client program sends logging/monitoring events to the automation server as they happen, which the server receives at step 414 of FIG. 4. This may include, for example, warnings/errors encountered, navigational events (e.g., the application entered a User Profile screen), and performance-related information (a new work item was executed on background worker item).

In addition to passively receiving such information originated at the client during the running of the client, server-side plug-ins can also send queries and/or commands to the client to actively ask for some information, as represented by step 416 of FIG. 4. Queries are responded to and commands are carried out by the counterpart plug-in. Examples of queries include the integration test plug-in asking the client to send information about its current View tree (that is, the client's current user interface tree in a tree format). As another example, the performance dashboard may ask the client to send information regarding the client's current memory usage. An example of a command is having the server input dashboard asking the client to send an "Up" key/button to the client, which is handled by a virtual input device on the client as described below. Step 516 of FIG. 5 represent the client-side operations, e.g., receiving one or more query and/or commands from the server, and taking the requested action, e.g., to obtain information to respond to the query, or to perform the command. Queries are responded to at step 518.

The testing and communication continues until the server or client stops participating. This may be by request/agreement, e.g., the test ends, or because of some other reason, such as the client device crashing, being needed for another purpose and so on. In any event, if the server is done (and has not crashed), the server attempts to inform the client (steps 418 and 420 of FIG. 4), or vice-versa (steps 520 and 522 of FIG. 5).

Figure 6:
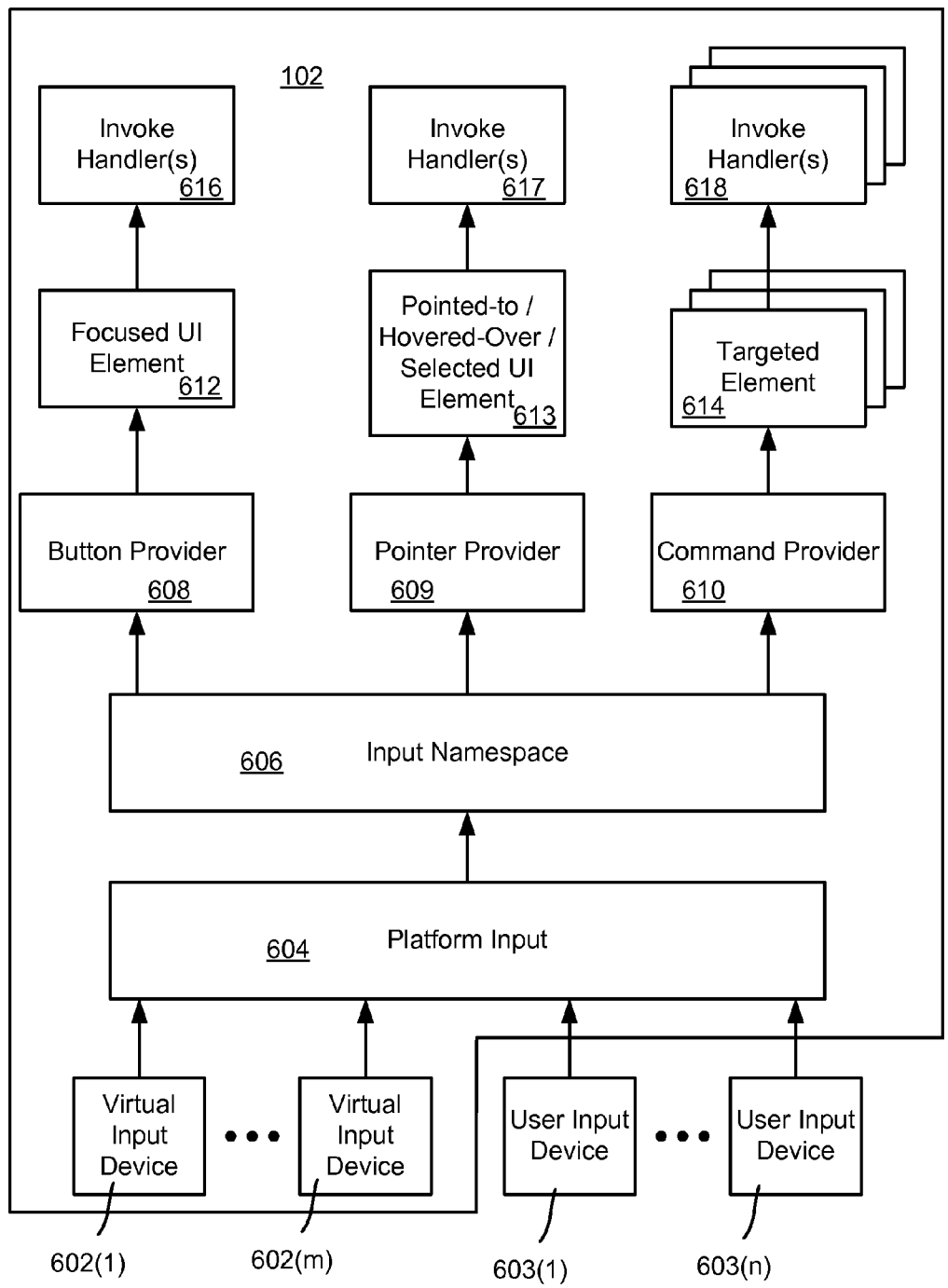
FIG. 6 is a block diagram showing an example configuration of components including virtual input devices for sending simulated device input/output (I/O) events to a user interface (UI) element or elements, according to one or more example implementations.

Turning to an example of how automation or manual interaction from the server side may send input to the client device, FIG. 6 is a block diagram showing various example components directed towards handling input at the client side. In general, a computing machine/device 102 has one or more virtual input devices 602(1)-602(m) coupled thereto to allow a user to interact with the computing machine/device 102. The virtual input devices 602(1)-602(m) provide virtual input data as if they were real input devices, and indeed, the virtual input data may be manually generated by a tester or the like using actual input devices. Automated virtual input data may be used in addition to or instead of manually generated virtual input data.

The computing machine/device 102 also may have user input devices 603(1)-603(n) coupled thereto. Depending on the type of computing machine/device 102, various non-limiting input devices include a physical and/or touch-screen keyboard, game controller, remote controller (e.g., for an interactive television), touch-screen, mouse or other pointer (including finger touch, trackball, joystick, etc.) input, gesture detection devices, speech detection devices and so on. As is understood, in a given scenario, not all such exemplified input devices are likely in use, and one or more other input devices may be present. Also note that an input device may be externally coupled to the computing machine/device 102, e.g., a remote controller or a camera, or internally coupled to (other components of) the computing machine/device 102, e.g., a touch-sensitive screen of a tablet device or smartphone, a built-in microphone and so on.

In general, the input is received at a given platform, and the platform may handle some of the platform input 604 at the platform level, e.g., to switch among application programs, perform platform-directed commands (shut off the computing device) and so on. In typical scenarios, however, much of the input is routed to an active (e.g., focused) application program or the like to allow user interaction with the application program's currently displayed user interface (UI) elements. Example program input includes sending input commands and/or data to a focused UI element, changing focus between UI elements, scrolling UI elements into and out of view, hovering a mouse pointer over different UI elements and so on.

An input namespace component 606 or the like may be used to map input from different input device sources to one of a limited number of providers, generally based upon the type of input. Three such providers are exemplified in FIG. 6, namely a button provider 608, a pointer provider 609 and a command provider 610. Note that the "providers" comprise an input normalization mechanism and corresponding logic, and thus may be part of a larger entity, e.g., a single object or the like may receive input and classify it as a button event, pointer event or command event and include logic for dealing with each type of event with respect to one or more UI elements.

It should be noted that a computing machine may be coupled to a virtual input device that is not directly supported by the computing machine/device 102. For example, consider a device that does not have a touch-sensitive screen, such as a personal computer with a conventional display-only monitor. A tester can enter data via a touch-sensitive screen using a finger or stylus to provide virtual pointer data to the application program; because the program code (e.g., its currently pointed-to or hovered over UI element) only receives pointer events and accompanying data via the pointer provider, the program code operates as if a mouse, which is supported, was used to generate the pointer events, for example. Indeed, in real time, even if there is no device driver and so on for a particular device, a user may use such an unsupported device to send virtual input data to a program element running on another device, e.g., via a wired (e.g., USB or LAN) connection, Wi-Fi, Bluetooth®, infrared and so on, and thereby have the program element execute an invoke action as if directly coupled and supported.

With respect to unified input and invoke handling, it is desirable to be able to describe what happens when a piece of UI is invoked, independent of how it was invoked. This is useful for many reasons, including that the system can describe the invoke intent once, instead of many times, and allow an upstream input system to determine whether that invocation should occur, (e.g., factoring in platform-independent and platform-dependent input devices). This also normalizes input concepts to a limited number of (e.g., three) types, exemplified herein as Button, Pointer and Command types, despite differences among actual input devices. Among other benefits, this makes the input handling system extensible as new devices are invented or added to a platform. This further enables remapping of device types based on user intent, whereby, for example, a keyboard can act as a gamepad in a way that is transparent to the application program UI.

To accomplish unified input and invoke handling across devices and platforms, described herein is an input provider system for normalizing virtual and physical device input, in conjunction with a unified concept of invoke handlers to allow the declaration of invocation actions for the various types of input.

In one or more implementations, button provider input is routed to the single focused UI element 612, expecting that the element may have an appropriate button invoke handler, while command provider input is routed to all visible elements 614 that match a given command (not any off-screen elements). Pointer provider input targets the UI element currently under the pointer device's logical cursor, referred to herein as the pointed-to, hovered over and/or selected UI element 613.

Note that UI elements are arranged in a UI tree, e.g., from a highest-level parent (e.g., a menu) to its children (e.g., sub-menus), which are parents to its own children (e.g., selectable items) and so on. When an invoke action does occur on a UI Element, the invoke action is performed by the corresponding invoke handler or handlers for each invoked UI element. In the event that the invoke is not handled by a UI element, e.g., because the element does not have a suitable invoke handler for the invoke event, the invoke bubbles up the UI tree, allowing its parent element in the ancestor chain to handle the event that was not handled lower in the tree. For example, with button provider input, the input bubbles up the focus train in the tree until handled.

A given UI element may have one or more invoke handlers associated with that element. An invoke handler 616-618 or may have properties including button, pointer, command text and invoke actions.

Figure 7:
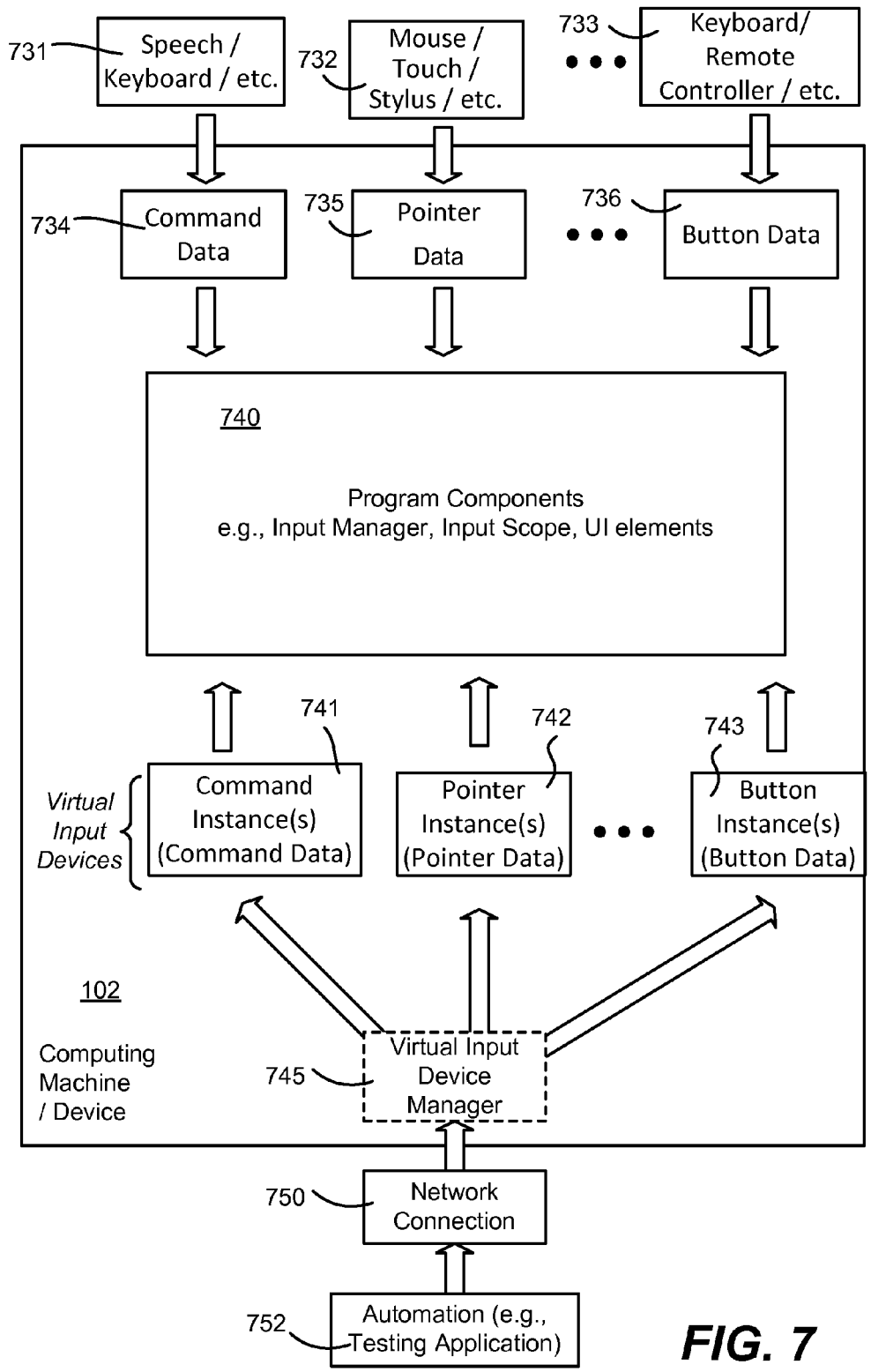
FIG. 7 is a block diagram showing an example configuration of components including virtual input devices and actual (e.g., physical) input devices coupled to program components, according to one or more example implementations.

As represented in FIG. 7, example input devices may include one or more pointer devices 732. This device type uses hit-testing to provide input (pointer data 735) that is directed to the user interface (UI) element "under" the pointer. A button device 733 is a device type that provides input (button data 736) that is directed to the UI element that has "focus". A command device 731 is a device type that provides command input data 734 that is directed towards a UI element on the screen, but not through the use of hit-testing or focus. Examples include a speech recognizer, a gesture detector, certain keys of a keyboard, and so forth. Other input devices are contemplated, including those that input speech, gestures, eye gaze, skeletal data and so forth.

These and other well-defined device types provide a consistent input interface that other platform components can depend on and act on. When adapting an application to a new hardware platform, the developer can map the available hardware input devices onto one or more of these types, without affecting other components 740 of the application program. As described herein, differences between the virtual input devices are based on how each type of input is intended to be used (invoke intent), how input events are organized and exposed, and what data each input event contains.

In addition to mapping physical devices to one of the types of input devices, the platform also may create instances of such devices that are not backed by physical hardware, (possibly remotely, but at least not directly). These instances are referred to as "virtual input devices" and may, for example, be object instances. There may be one or more command instances 741 that provide command data, one or more pointer instances 741 that provide pointer data, and one or more button instances 741 that provide button data. Each instance may simulate a particular physical device, e.g., there may be a keyboard instance and a game controller instance that each provides button-related data to a button provider, e.g., the same data as if an actual keyboard and actual game controller were providing the data. Such simulated data may be used to test the provider code/logic itself.

In an alternative implementation, a virtual input device may output "provider" data, e.g., directly to a UI element, (possibly in addition to simulating actual device data). Having a virtual input device (or a different type of virtual input device) that is able to sometimes bypass the provider and sometimes go through the provider may allow certain scenarios to be tested that are not otherwise easily tested. Note that the input device whether virtual or actual that was used to provide input is mostly internally processed by the appropriate input provider, but there are times where the application program may access this information. Although in many instances the application program code does not care about the specific input device, if the application program code does care, the invoke handlers are able to process the input provider event arguments to determine the specific source of input. For example, if desired, a game application program may differentiate between a keyboard and gamepad controller, even though both correspond to a button provider, such as to make game play be more consistent between devices (e.g., if one device makes possible faster user input than the other). Such code may be tested with and without the actual provider involved, to determine if the provider or the invoke handler, for example, is causing a bug.

In one or more implementations, the virtual devices are controlled by input taken from a network over a network connection 750, although local virtual input is feasible. This allows an automation framework 752 to insert input into the application, such as to allow the application to be automated easily for testing, troubleshooting and/or providing user help-related actions without modifying any of the application's other components.

Also shown in FIG. 7 is a virtual input device manager 745, which may be optional (or handled by the program code) at least to an extent. For example, if the virtual input devices are objects, they may only be instantiated if needed, e.g., as requested by automation 752 or some other entity. The virtual input device manager 745 may handle this instantiation. Further, the virtual input device manager 745 may direct instructions and data to the appropriate virtual input device, e.g., a test may specify to "click" on a particular UI element and thereby give that element focus, followed by "typing" a set of keystrokes (as button data) to that focused UI element. Such a test may specify that a mouse virtual input device be used, and provide a location to move the mouse pointer and the click instruction. Once focused, the test may further specify that a keyboard virtual input device be used to send the keystrokes. The virtual input device manager 745 may call one or more appropriate functions (methods) on the appropriate virtual input device functions to make this happen without the automation having to know the details of each virtual input device object. The virtual input device manager 745 also may be instructed to perform some timing-related actions, e.g., send the keystrokes at a "typical user" rate to the focused UI element rather than as fast as possible.

Figure 8:
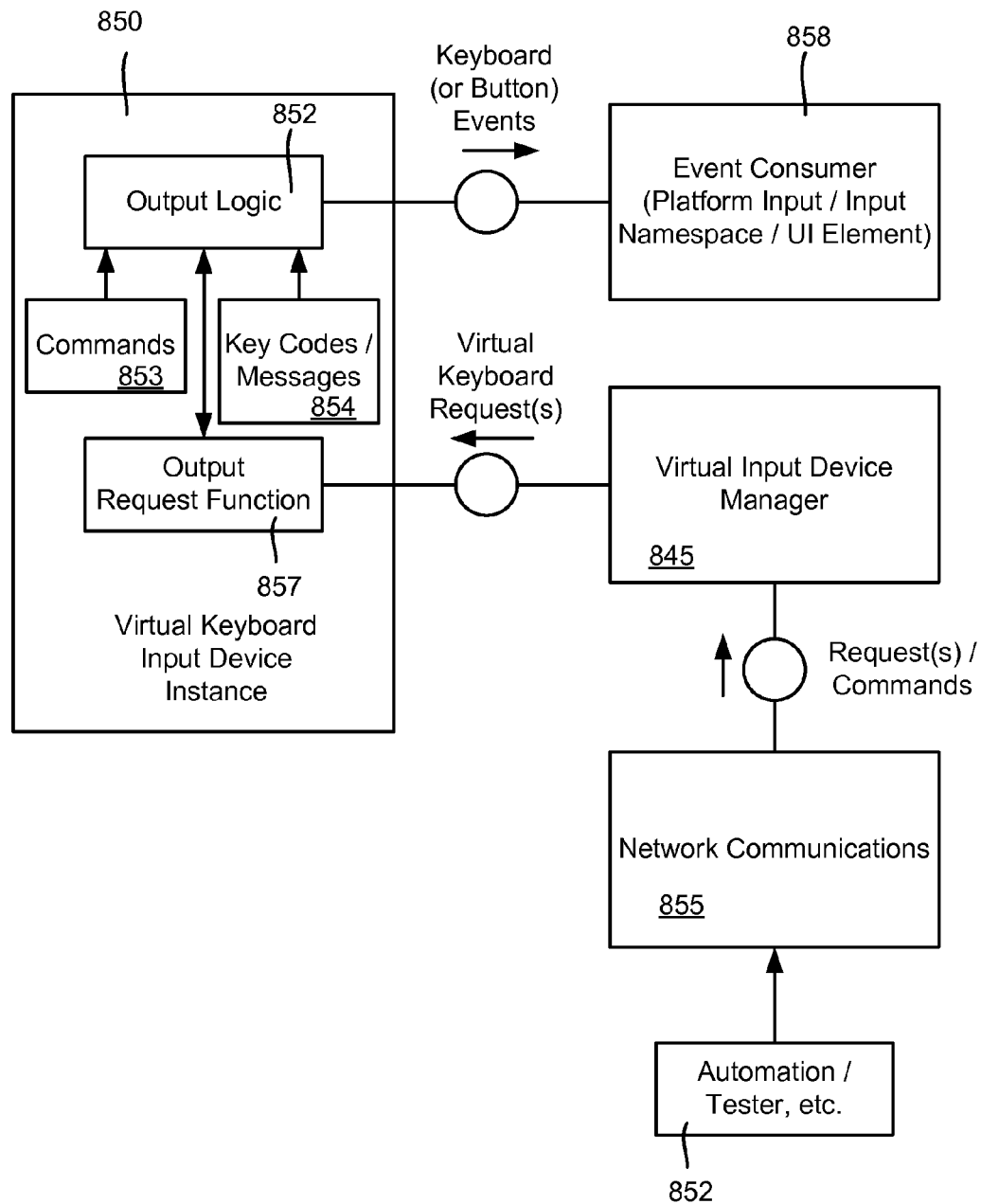
FIGS. 8-10 are block diagrams showing example object instances used as a virtual keyboard device (FIG. 8), a virtual mouse device (FIG. 9) or a virtual command device (FIG. 10), according to one or more example implementations.
Figure 9:
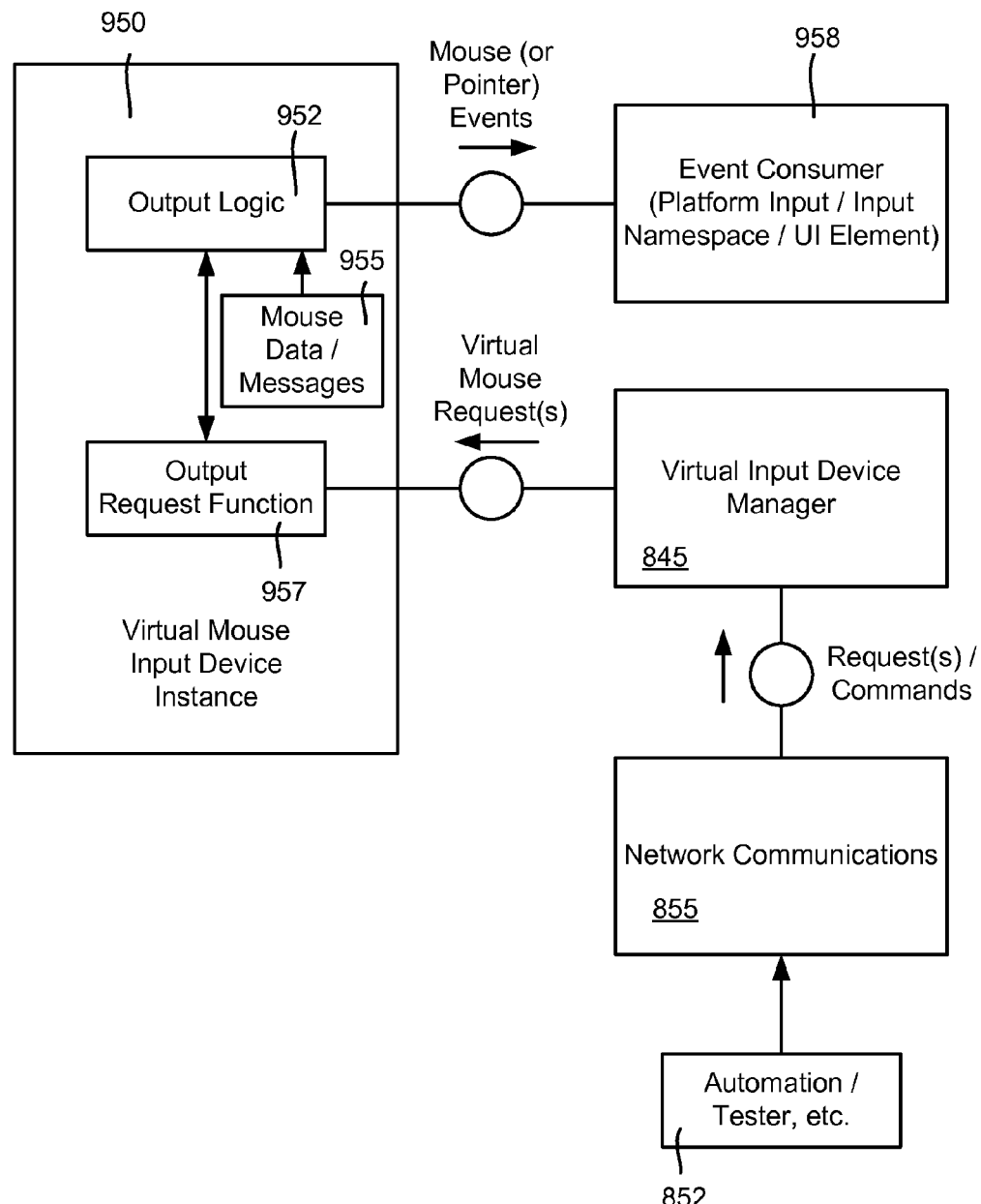
Figure 10:
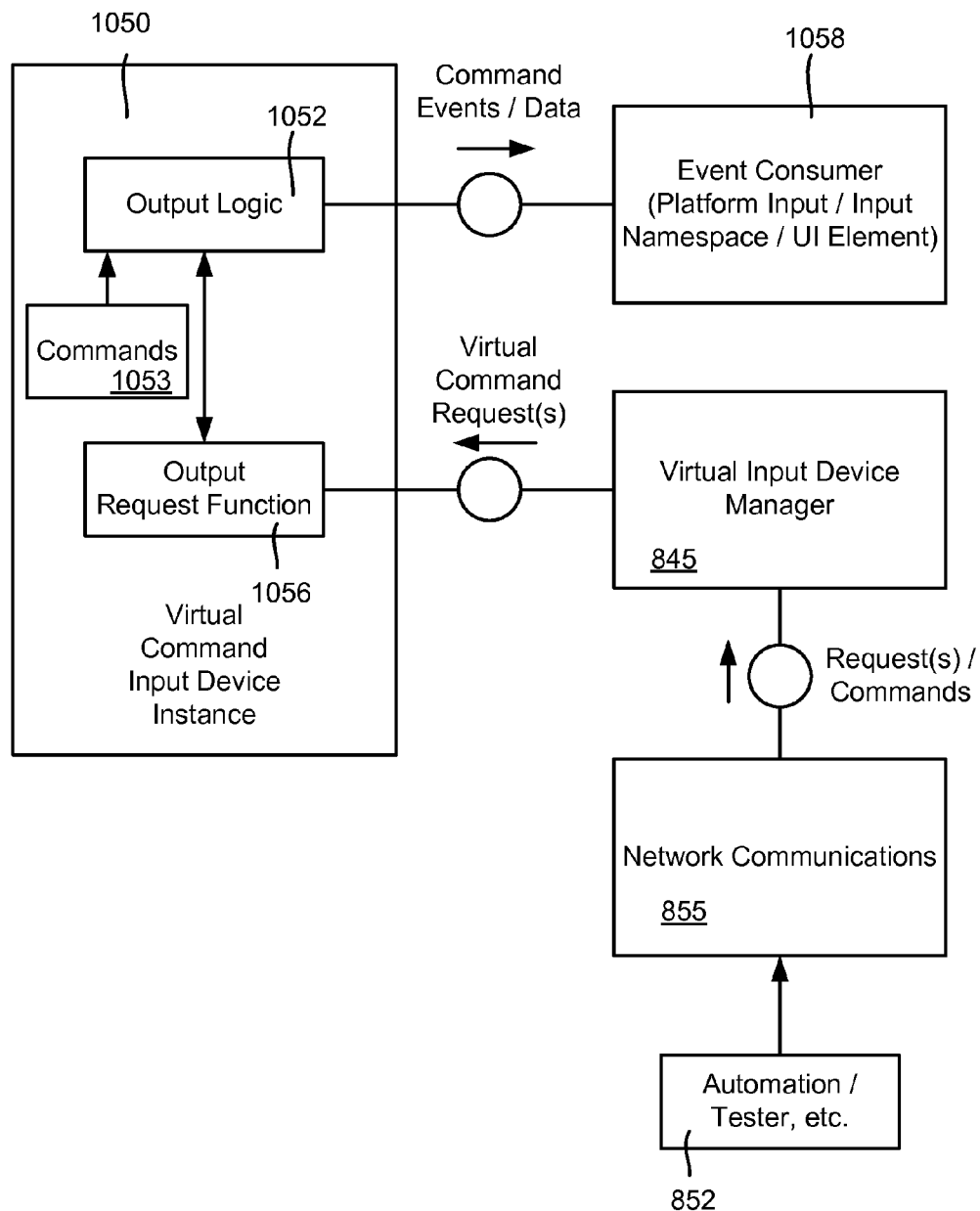

FIGS. 8-10 are example block diagrams representing how object instances may be used to provide virtual input devices for an example virtual keyboard device, virtual mouse device and virtual command device, respectively. Thus, in these examples, the virtual keyboard device, virtual mouse device and virtual command device are object instances, virtual keyboard device object instance 850 (FIG. 8), virtual mouse device object instance 950 (FIG. 9), and virtual command device object instance 1050 (FIG. 10). Output logic 852 (FIG. 8), 952 (FIG. 8) and 1052 (FIG. 10) in each object instance determines the appropriate event output for the event consumer, which as exemplified in FIG. 6 may be the platform input 604, input namespace component 606, a provider (e.g., 608-610) or a UI element directly, depending on a given implementation and, for example, the purpose of a test. Such consumers are represented in FIGS. 8, 9 and 10 as event consumers 858, 958 and 1058, respectively. Note that in an implementation in which a virtual device object is configured to communicate with a UI element directly, the virtual device object may include the normalization functionality of a provider so that the UI element receives the simulated event data as expected.

As represented in the examples of FIGS. 8, 9 and 10, each object instance 850, 950 and 1050 has an output request function 857, 957 and 1057 that is called to simulate the output of an actual input device event. In general, in any suitable way, automation and/or an actual person (e.g., a tester) may send network (and/or possibly local) requests that simulate user interaction with an actual input device.

By way of example, automation and/or an actual person may make network communication requests that are handled by a network communications object 855 or the like. These requests are directed by a virtual input device manager object instance 845 to the appropriate virtual input device object instance based on some identifying information accompanying the request. Note that the functionality of the virtual input device manager object instance 845 may be built into the network communications object 855, or the network communications object 855 may host such a virtual input device manager object.

The test data or the like may be as simple or as close to actual data as desired in a given implementation. For example, for keyboard input, the actual KEYDOWN and KEYUP data messages may be logged (or automatically generated) and passed through the virtual keyboard input device instance generally as is, and similarly with mouse messages for a virtual mouse input device instance.

However, the virtual device instances alternatively (or in addition to passing message data) may maintain codes and message data (e.g., 854, FIG. 8) that allows the virtual input device to basically translate requests to appropriately simulated device data. For example, a test may simply specify something like "type ABCD," which the virtual input manager knows to call the request function of the virtual keyboard input device instance 850, which in turn accesses codes/message data 855 to produce KEYDOWN and KEYUP data messages for each character. Similarly, a request such as "move the mouse pointer to location (X, Y)" may result in a function call to the virtual mouse input device instance 950, which accesses the mouse data/messages 955 to simulate in order to do so. Note that simulated pointer movement may be gradual, e.g. the pointer may be moved to intermediate positions by the mouse virtual input device before reaching the X, Y location rather than jumping to the location directly; (the test data may do so directly, or request that some intermediate movements be computed and simulated by the virtual input device). A command request such as "Xbox Play" instead calls a function of the virtual command input device instance 1050 that is simulating a voice input/recognition device via its command data 1055; note that a virtual keyboard input device also may simulate commands, e.g., via a set of commands 853 mapped to certain keys.

Having such mechanisms built into the objects may make for more complex objects, but the amount of data transmitted over the network may be reduced, and further, different types of generally the same type of virtual input device instances (but possibly with subtle differences) may be used with the same test data. For example, one type of pointer device may output message data slightly differently from that of another pointer device, yet the same test command "move the mouse pointer to location (X, Y)" may be used with different types of virtual pointer input devices to simulate the appropriate messages that cause the same pointer movement.

As is readily apparent, in some implementations the device to simulate may be inherent based upon the type of input data that is requested to be simulated, e.g., type "ABCD" is clearly a request to invoked a virtual keyboard input device. However, if there is possibly conflicting request data, e.g., "type ABCD" is requested when there is an instantiated physical keyboard input device instance and instantiated touch-screen keyboard input device instance, the test may specify which to use, e.g., e.g., "type ABCD touch-screen." If not specified, some default override may be used, e.g., use the virtual keyboard device over the virtual touch-screen device if not specified.

As can be readily appreciated, such simple requests (e.g., manually provided by a tester) may be translated to the actual events/message data at any suitable time. This may occur within the virtual device objects as described herein, or may occur in an external, possibly offline process that is then saved as a named test to be run, for example. As is understood, the overall virtual input device system is entirely flexible and many different variations may be implemented.

As can be seen, the technology described herein provides for remote testing, debugging, monitoring and the like. A server can have clients run tests, monitor data, answer queries, simulate input, view output and other functionality. Automation may be used in the operations, as well as manual interaction.

One or more aspects are directed towards coupling a server machine to a remote client device for testing and/or monitoring of a client device program. The server loads server-side component(s) related to the testing and/or monitoring of the client device program, and uses the server-side component to have a server-side specified testing and/or monitoring set of operations performed on the client device program. Described herein is receiving logging data at the server corresponding to the set of testing operations performed on the client device program, and/or receiving monitoring data at the server corresponding to the set of monitoring operations performed on the client device program.

A query may be communicated from the server to the client device program, to receive a response from the client device program. The client may obtain information requested via the query, and communicate the information from the client device program to the server to respond to the query.

Using the server-side component to have the server-side specified testing set of operations performed by the client device may include running an automated test on the client device program. Using the server-side component to have the server-side specified testing and/or monitoring set of operations performed by the client device program may be directed towards debugging the client device program.

The client device program may be instructed to not send information that the client device program is capable of providing but is unwanted by the server for the set of server-side specified testing and/or monitoring set of operations.

The server may communicate a command to the client device program to invoke a client-side action. The command may be for injecting input to the client device program via a virtual input device coupled to or incorporated into the client device program. The command may be to obtain data corresponding to at least part of a user interface tree of the client device program. Upon receiving the command at the client device program, the client device program takes action with respect to executing the command.

One or more aspects are directed towards a client device having a channel manager component that establishes a communication channel with a server. The client includes one or more plug-in components that are able to be coupled to an application program of the client device and correspond to one or more testing-related operations and/or one or more monitoring-related operations. The client-device communicates with the server, including to receive information as to which server-specified plug-in component or plug-in components to couple to the application program, in which the server-specified plug-in component or plug-in components are coupled to the application program to communicate with one or more server components to perform testing-related operations and/or monitoring-related operations, and to communicate data to the server corresponding to performing the testing-related operations and/or monitoring-related operations.

The client plug-in component or plug-in components may communicate data to the server corresponding to test log data and/or performance monitoring data.

The client application program may be coupled to or incorporate one or more virtual input devices; the one or more server components may inject input to the client application program via the one or more virtual input devices. One such virtual input device may send input to a button provider, and another virtual input device that sends input to a pointer provider.

The one or more server components may be plug-in components for automated testing of the client application program and/or for monitoring of the client application program. The server components may include one or more server-side dashboard components to provide for server-side interaction with the client application program.

One or more aspects are directed towards running server-specified testing operations and/or server-specified monitoring operations on a client application program, in which one-or more plug-in components are coupled to the client application program and configured to communicate information to a server. Described herein is communicating data corresponding to the testing operations and/or or data corresponding to the monitoring operations from the plug-in components to the server.

The client may receive a query from the server, obtain information at the client device with respect to the query, and respond to the query to return at least part of the information. The client may receive a command from the server, and take action at the client application program to execute the command. This may include receiving a command directed to inputting input into the client application program, and taking the action may include using a virtual input device to input the input to the client application program. This may include receiving a command directed to returning data corresponding to at least part of a user interface tree, and taking the action may include returning the data corresponding to at least part of a user interface tree to the server.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
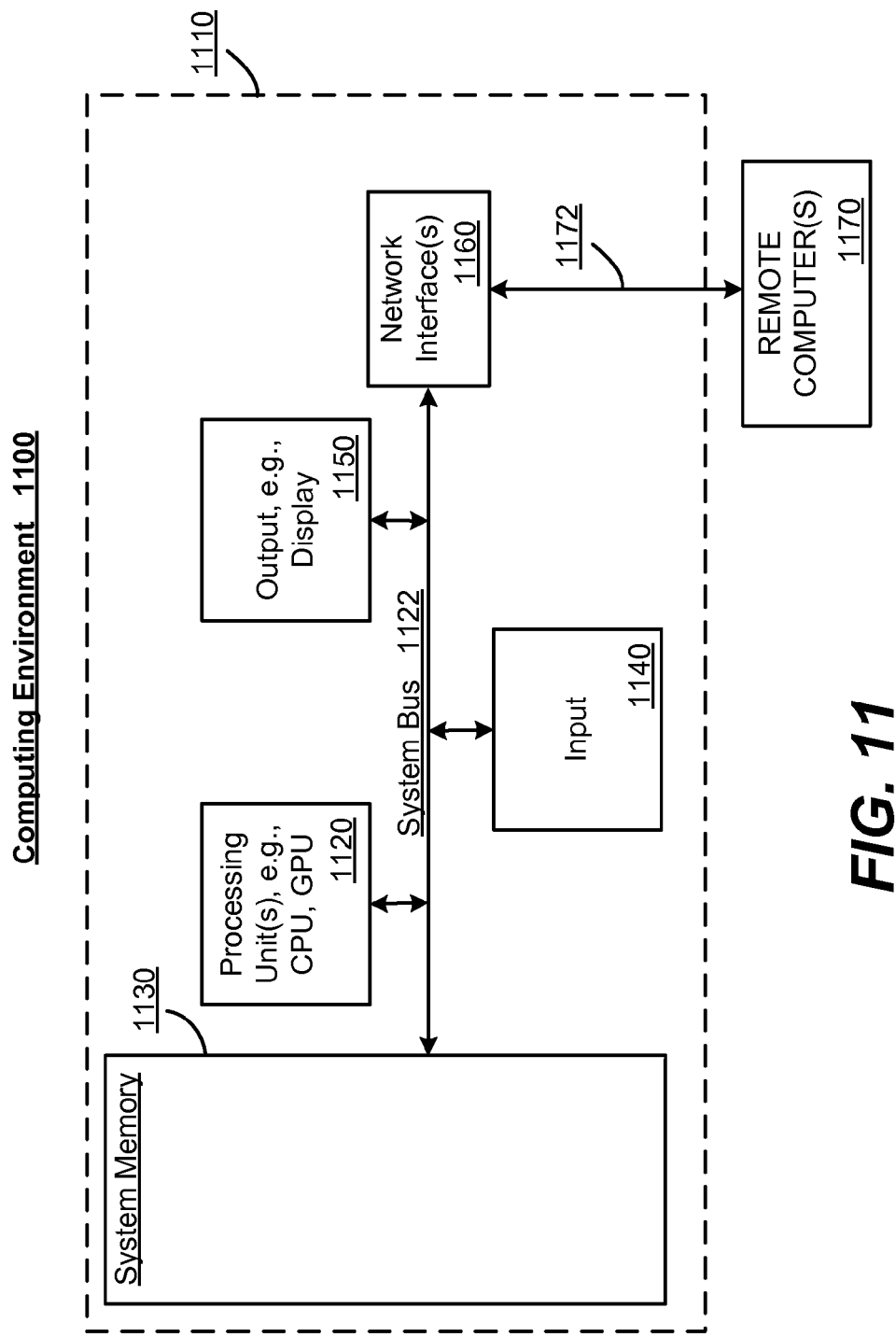
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
loading, by a server device comprising a processor, server-side plug-in components respectively providing distinct testing operations of a client device program operating on a client device;
communicating, by the server device, a message comprising information on the loaded server-side plug-in components to the client device that initiates the client device to load respective client-side plug-in components that correspond to the server-side plug-in components;
establishing, by the server device via the server-side plug-in components, respective communication links between corresponding server-side plug-in components and client-side plug-in components; and
executing, by the server device via the server-side plug-in components, one or more of the distinct testing operations on the client device program.

2. The method of claim 1, wherein the executing the one or more of the distinct testing operations comprises communicating, by the server device, a query to the client device program, and receiving, by the server device, a response from the client device program in response to the query.

3. The method of claim 1, wherein the executing the one or more of the distinct testing operations comprises monitoring one or more events generated by the client device program.

4. The method of claim 1, wherein the executing the one or more of the distinct testing operations comprises running, by the server device, an automated test on the client device program.

5. The method of claim 1, wherein the executing the one or more of the distinct testing operations comprises debugging, by the server device, the client device program.

6. The method of claim 1, wherein the executing the one or more of the distinct testing operations comprises instructing, by the server device, the client device program to not send information that the client device program is capable of providing but is unwanted by the server device for the distinct testing operations.

7. The method of claim 1, wherein the executing the one or more of the distinct testing operations comprises communicating, by the server device, a command to the client device program to invoke a client-side action.

8. The method of claim 7, wherein communicating the command comprises injecting input to the client device program via a virtual input device coupled to or incorporated into the client device program.

9. The method of claim 7, wherein communicating the command corresponds to obtaining data corresponding to at least part of a user interface tree of the client device program.

10. The method of claim 1, wherein the executing the one or more of the distinct testing operations comprises obtaining, from the client device, logging data generating by the distinct testing operations executed on the client device program.

11. A non-transitory computer-readable medium having instructions stored thereon that, in response to execution, cause a server device including a processor to perform operations, comprising:
  loading, by a server device, server-side plug-in components respectively providing distinct testing operations of a client device program operating on a client device;
  communicating, by a server device, a message comprising information on the loaded server-side plug-in components to the client device that initiates the client device to load respective client-side plug-in components that correspond to the server-side plug-in components;
  establishing, by a server device via the server-side plug-in components, respective communication links between corresponding server-side plug-in components and client-side plug-in components; and
  running, by a server device, one or more of the distinct testing operations on the client application program.

12. The non-transitory computer-readable medium of claim 11, wherein the running the one or more of the distinct testing operations comprises communicating, by the server device, a query to the client device program, and receiving, by the server device, a response from the client device program in response to the query.

13. The non-transitory computer-readable medium of claim 11, wherein the running the one or more of the distinct testing operations comprises communicating, by the server device, a command to the client device program to invoke a client-side action.

14. The non-transitory computer-readable medium of claim 13, wherein communicating the command comprises injecting input to the client device program via a virtual input device coupled to or incorporated into the client device program.

15. The non-transitory computer-readable medium of claim 11, wherein debugging, by the server device, the client device program.

16. A system, comprising:
  a server device, comprising a processor, configured to:
    loading server-side plug-in components respectively providing distinct testing operations of a client device program operating on a client device;
    communicate a message comprising information on the loaded server-side plug-in components to the client device that initiates the client device to load respective client-side plug-in components that correspond to the server-side plug-in components;
    establish, via the server-side plug-in components, respective communication links between corresponding server-side plug-in components and client-side plug-in components; and
    execute, via the server-side plug-in components, one or more of the distinct testing operations on the client device program.

17. The system of claim 16, wherein the execution of the one or more of the distinct testing operations comprises communication of a query to the client device program, and receipt of a response from the client device program in response to the query.

18. The system of claim 16, wherein the execution of the one or more of the distinct testing operations comprises receipt of information associated with one or more events generated by the client device program.

19. The system of claim 16, wherein the execution of the one or more of the distinct testing operations comprises execution of an automated test on the client device program.

20. The system of claim 16, wherein the execution of the one or more of the distinct testing operations comprises a debugging operation of the client device program.

* * * * *